3,102,916
TRIS THIOETHERS
Walter Reifschneider, Midland, Mich., assignor to The Dow Chemical Company, Midland, Mich., a corporation of Delaware
No Drawing. Filed June 27, 1962, Ser. No. 205,498
4 Claims. (Cl. 260—609)

The present invention is directed to thioethers and in particular is directed to novel thioethers corresponding to the formula

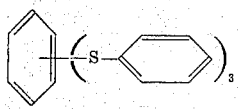

The compounds are thus tris(phenylthio)benzenes.

The novel compounds are, under ordinary conditions, light-colored to colorless crystalline solids or oily liquids, very slightly soluble in water but readily soluble in various common organic solvents such as lower alkanols, benzene and the like. In general, greater steric symmetry is associated with a higher melting temperature in the subject compounds. The compounds are useful as insecticides and herbicides. They are also useful as additives to lubricating oils; they are useful as intermediates in the preparation of dyestuffs and biologically active materials; they are also of value as components of fluid heat-transfer systems.

The compounds are prepared by a process which comprises the steps of causing a reaction between a compound corresponding to the formula

wherein X represents halogen, and benzenethiol or a cuprous or alkali metal salt of benzenethiol. During the reaction to prepare the present compounds, 3 molecules of benzenethiol react with each molecule of aromatic halide. Small amounts of benzenethiol may be lost in side reactions. Thus, when it is desired to prepare the present compound in a high state of purity and with a minimum of necessary post-synthesis purification procedure, the starting reactants should be employed in the proportions of one mole of aromatic halide with three moles of benzenethiol, or preferably, with the benzenethiol in slight excess. However, other proportions may be employed if desired, and unconsumed starting material of whatever identity may, if desired, be recycled into further synthesis process.

The reaction goes forward at temperatures over a wide range, but initiates most readily when heated to a temperature somewhat higher than room temperature; under these conditions the reaction is, in general, exothermic and goes forward to completion with good yield calculated upon the basis of consumed starting material. When benzenethiol is employed, hydrogen halide of reaction is evolved and means for its orderly disposal are advantageously provided. When a metallic benzenethiolate is employed, metallic halide is evolved.

Typically, in the preparation of the compounds of the present invention, reaction between the benzenethiol starting material and the aromatic halide starting material will initiate and go forward only when there is employed a catalytic amount of both a source of cuprous ion and a nitrogenous base. Thus, probably, in the preparation of all of the present compounds, the employment of such catalyst is essential and critical, although the exact weight is not critical. Certainly the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Cuprous chloride itself or other cuprous salt may be employed. The employed amount is not critical, but may vary from a very small trace amount, less than 1/100 of 1 molar percent, to as much as an amount equimolecular with either reactant or even greater. In general, the employment of larger amounts is accompanied by no major advantage and, being expensive, is not preferred.

The nitrogenous base may be ammonia, a primary secondary, or tertiary aliphatic or aromatic amine or a nitrogenous heterocycle wherein the nitrogen acts, or is capable of acting, as a basic substance. If desired, the nitrogenous base may be a naturally liquid substance which is employed as a reaction medium. Otherwise such base is dissolved in inert liquid reaction medium such as a hydrocarbon oil.

It is preferred, at least on laboratory scale, to employ the nitrogenous base catalyst substance in sufficient excess that portions of it may also act as hydrogen halide acceptor and yet further portions may continue to function, unreacted, in the necessary catalytic manner.

In carrying out the reaction to prepare the compounds of the present invention, the aromatic halide and the benzenethiol are intimately mixed and blended, in any order and in desired amounts, with source of cuprous ion and nitrogenous base as hereinbefore described and thereafter heated to a temperature at which reaction takes place promptly. In one convenient method of practicing the present method, the reaction temperature may be the reflux temperature of the liquid reaction medium. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate usually forms from which the desired product can be extracted as a solvent-soluble fraction. Representative extraction solvents include diethyl ether, chlorinated hydrocarbons, and benzene. In any event, the reaction product is extracted with solvent, the solvent extract dried over an inert drying agent such as, for example, anhydrous potassium carbonate or the like; the solvent vaporized and removed and the remaining product chilled or otherwise induced to crystallize and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

EXAMPLE I

*1,3,5-Tris(Phenylthio)Benzene*

A reaction mixture is prepared, consisting of 31.6 grams (0.1 mole) of 1,3,5-tribromobenzene, 16 grams of cuprous oxide (technical grade) and 34 grams (approximately 0.3 mole) of benzenethiol dispersed in a mixture consisting of 110 milliliters quinoline and 10 milliliters pyridine. The resulting reaction mixture is placed in a flask under reflux with a water trap. In this situation, the reaction mixture is heated at its reflux temperature (a pot temperature between approximately 200° and 240° C.) for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous potassium carbonate which also neutralizes remaining traces of acidic substances; the resulting liquid is warmed to vaporize and remove ether solvent and obtain a residual oil. This oil crystallizes upon standing; the crystals are taken up in hot toluene and precipitated therefrom as toluene solvent cools, to obtain white crystals of 1,3,5-tris(phenylthio) benzene melting at 50°–52° C.

The compound of the present example is useful as a herbicide. The application of a water dispersion containing 0.4 percent by weight of the said compound as sole toxicant in resulting aqueous dispersion to a population of young tomato plants resulted in the kill of almost all of the said plants.

EXAMPLE II

In procedures essentially similar to the foregoing except that the starting benzenethiol compound employed in an amount approximately three times equi-molecular with the tribromobenzene is the cuprous salt of benzenethiol, there is prepared, in good yield, 1,3,5-tris(phenylthio)benzene as white crystals.

EXAMPLE III

1,2,4-Tris(Phenylthio)Benzene

A reaction mixture is prepared consisting of 13.1 grams (0.1 mole) 1,2,4-trifluorobenzene, 7.2 grams technical cuprous oxide, 33.6 grams (approximately 0.3 mole) benzenethiol dispersed together in 130 milliliters technical 2,4-lutidine and 60 milliliters quinoline, as mixed liquid reaction medium. The resulting reaction mixture is heated, with stirring, at its boiling temperature and under reflux overnight (approximately 15 hours), the reflux condenser being equipped with a water separator. At the conclusion of the reaction time, the resulting hot mixture is poured directly into a mixture of chipped ice and 200 milliliters concentrated hydrochloric acid. As a result of these procedures, the ice melts and a brown solid separates in the resulting aqueous dispersion. This solid is collected by filtration and a chloroform extract made of it. The chloroform extract is washed twice with 10 percent hydrochloric acid and then dried over anhydrous potassium carbonate. The resulting dry chloroform solution is distilled at gradually increasing temperatures and under declining subatmospheric pressure to obtain a 1,2,4-tris(phenylthio)benzene product as a pale yellow oil boiling in the range of 255° to 262° C. The compound is toxic to cockroaches and is a herbicide.

In procedures essentially the same as the foregoing, by the use of appropriate starting materials, the other product of the present invention is prepared.

By reaction of 1,2,3-trichlorobenzene and benzenethiol there is prepared on oily, pale yellow 1,2,3-tris(phenylthio)benzene product.

Also, by the use of 1,3,5-triiodobenzene and benzenethiol there is obtained a 1,3,5-tris(phenylthiol)benzene product.

The halobenzenes and benzenethiol necessary as starting materials in the practice of the present invention are articles of commerce, and they are readily prepared in known manners. The benzenethiol is prepared in any of various methods as set forth in "Organic Chemistry of Bivalent Sulfur" (Chemical Publishing Company, New York, 1958) by Reid, volume 1, chapter 1. The halobenzenes are prepared in such manners as those set forth in "Synthetic Organic Chemistry" (John Wiley & Sons, New York, 1953) page 124 and the references there cited.

I claim:
1. Compound of the formula

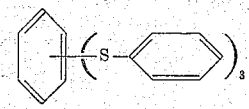

2. 1,2,3,-tris(phenylthio)benzene.
3. 1,2,4-tris(phenylthio)benzene.
4. 1,3,5-tris(phenylthio)benzene.

No references cited.